Jan. 19, 1971   G. O. JONES   3,555,569
WEARING APPAREL
Original Filed Jan. 18, 1968   7 Sheets-Sheet 1
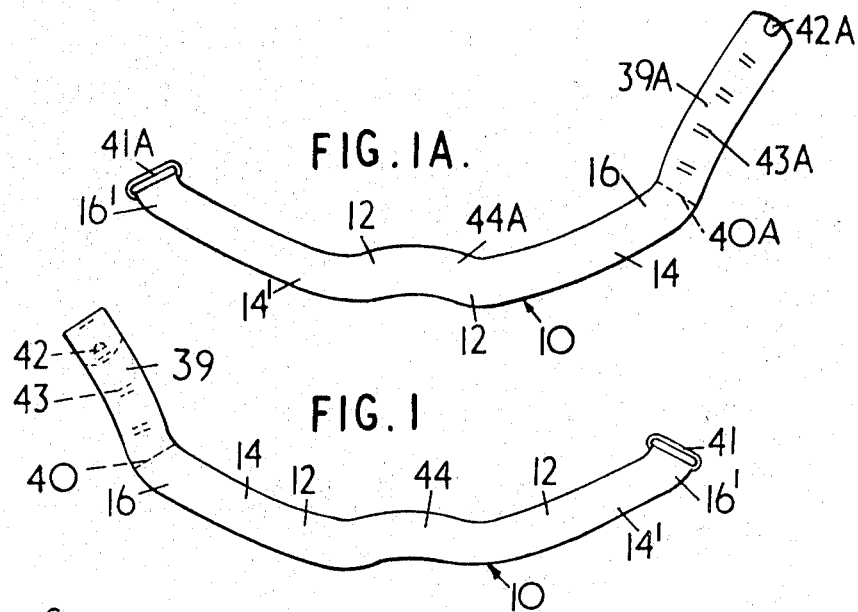
FIG. 1A.
FIG. 1.
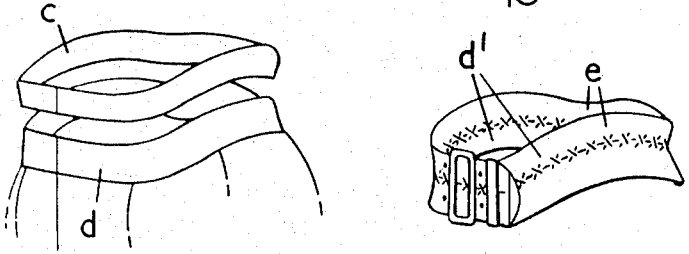
FIG. 2.   FIG. 3.
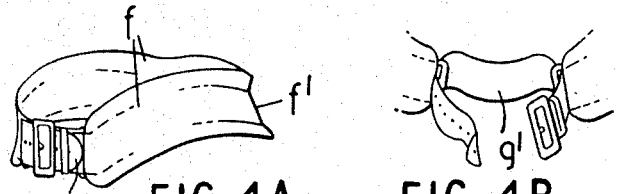
FIG 4A.   FIG. 4B.
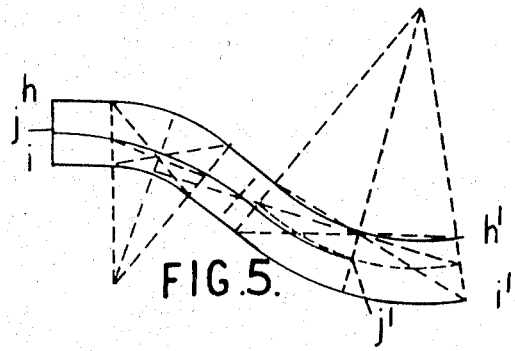
FIG. 5.
INVENTOR
BY GLYN OWEN JONES
ATTORNEYS

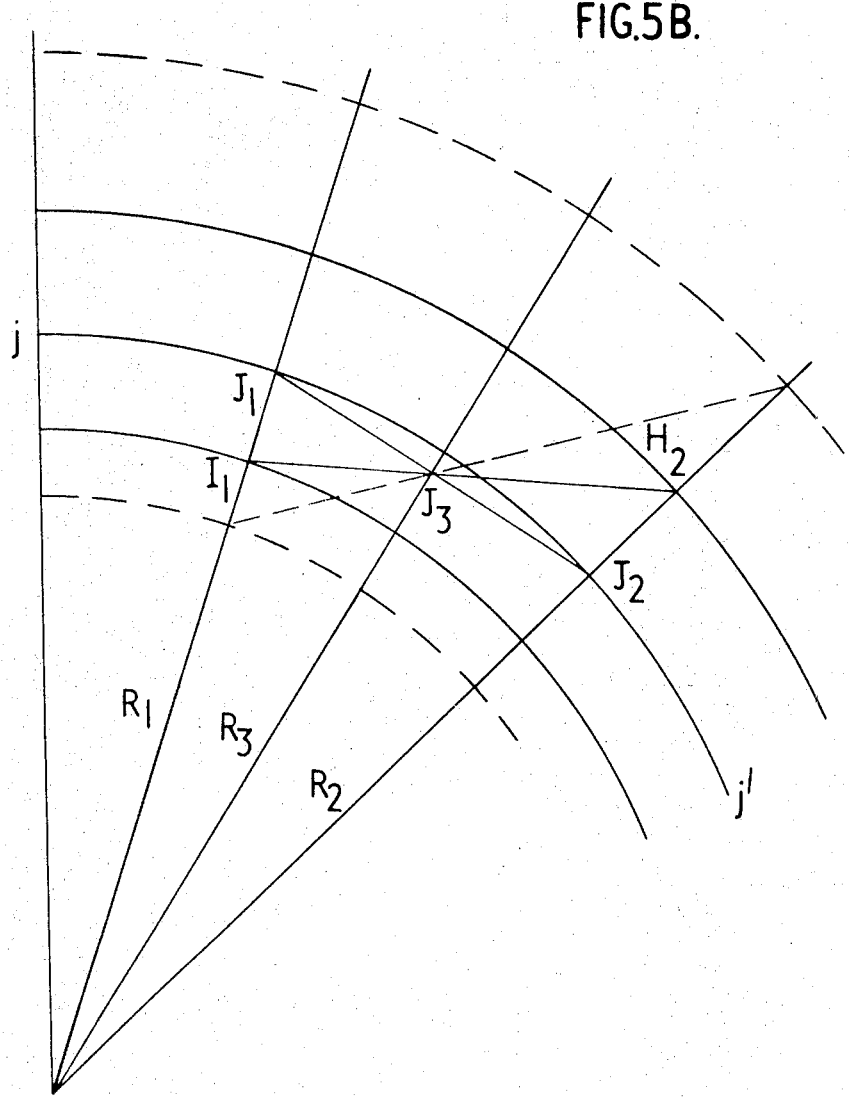

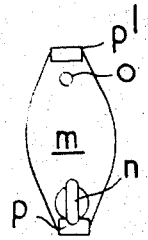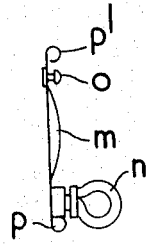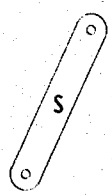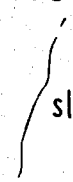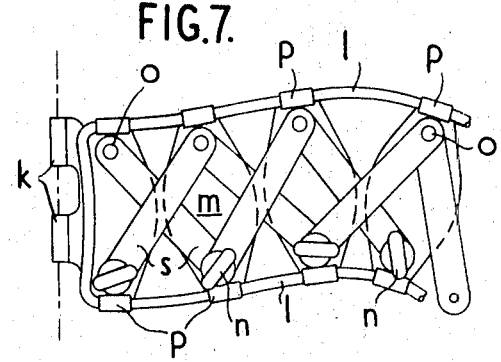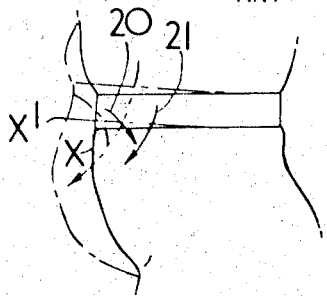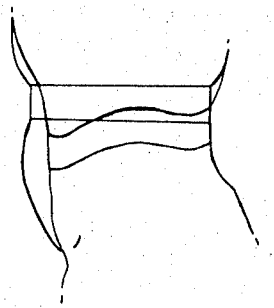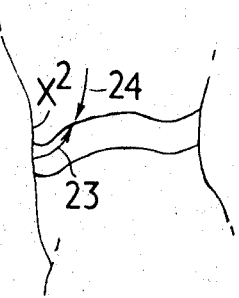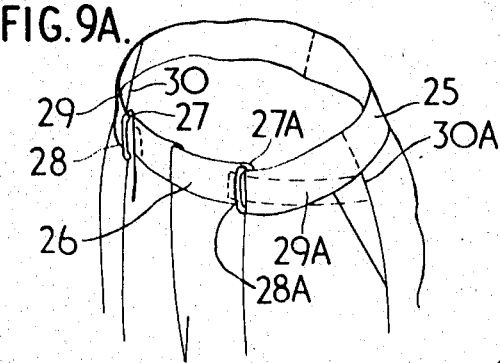

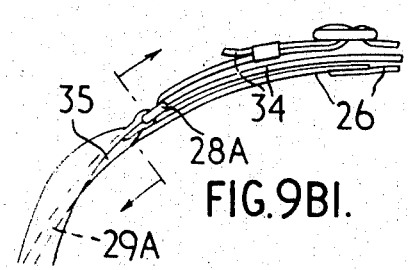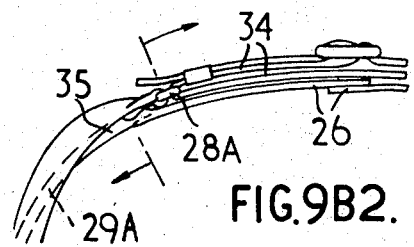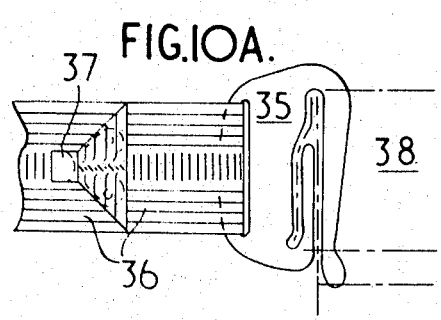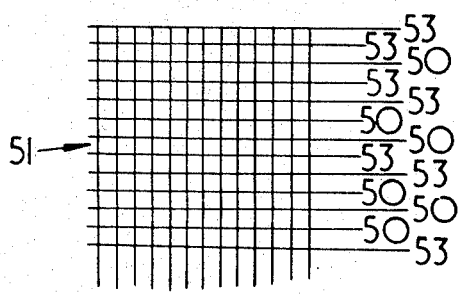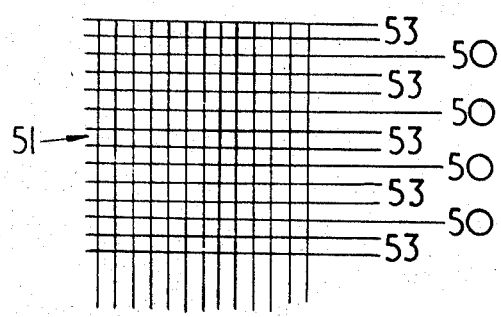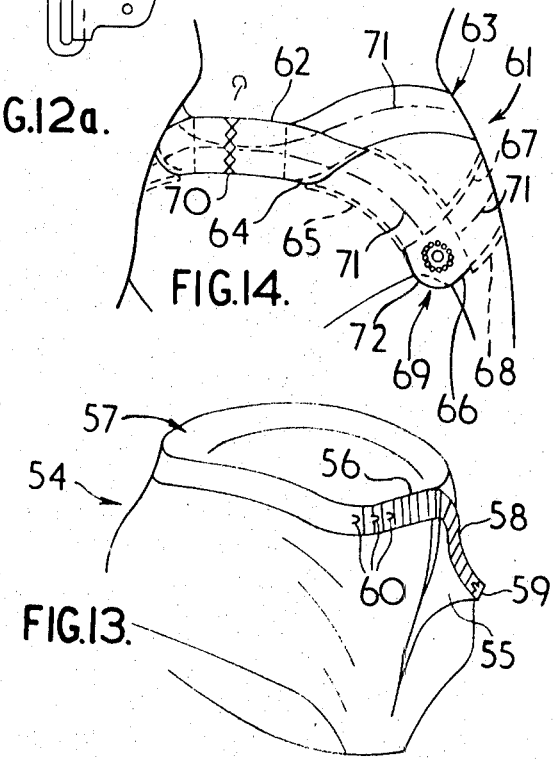

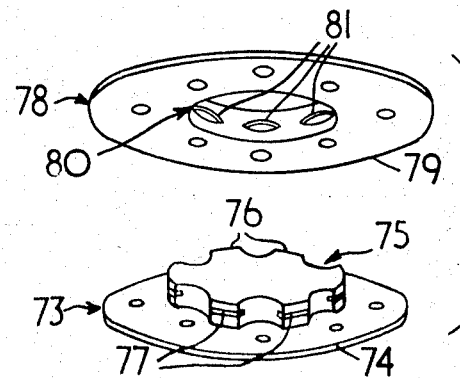
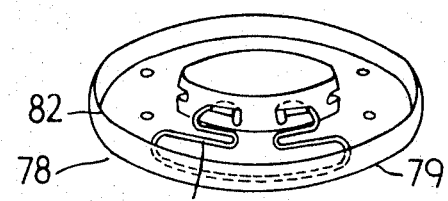
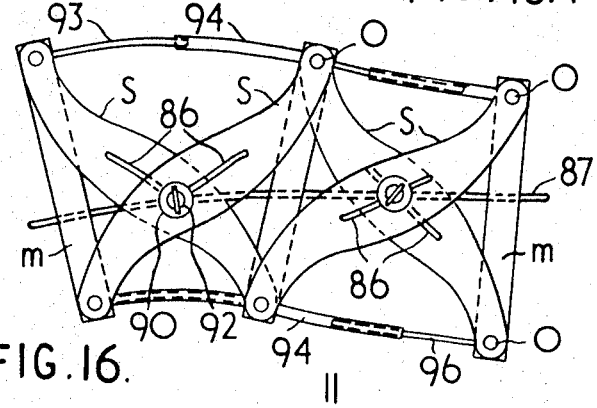
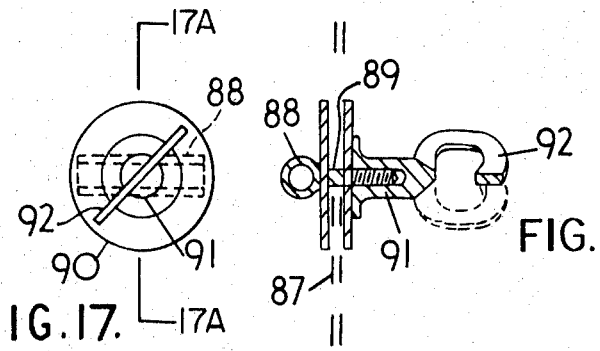
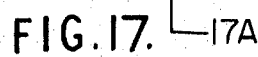

United States Patent Office 3,555,569
Patented Jan. 19, 1971

3,555,569
WEARING APPAREL
Glyn Owen Jones, 62 Lillie Road,
Fulham, London, England
Continuation of application Ser. No. 698,971, Jan. 18, 1968. This application Dec. 2, 1969, Ser. No. 876,196
Int. Cl. A41f 9/02, 19/00
U.S. Cl. 2—221                                            18 Claims

ABSTRACT OF THE DISCLOSURE

The invention provides a waistbelt or waistband of such a shape as to follow a geodesic circuit on the body of the wearer, whereby the tension in the belt or band is always in a plane perpendicular to the surface of the body. The desired shape is attained by lateral curves in an inelastic belt or band, or by inbuilt variations of elasticity across an elastic belt or band. In a preferred form, a belt when laid flat has arched portions corresponding to the front and back of the waist, and straight or inverted arched portions corresponding to the sides; when worn, the arched portions are generally horizontal and the side portions are arched over the hips.

---

This application is a continuation of my copending application Ser. No. 698,971 filed Jan. 18, 1968, now abandoned.

This invention relates principally to wearing apparel and is concerned in particular with articles of apparel which, when worn, encircles or include a part which encircles the body in the region of the waist. The invention thus deals with articles of apparel which include or consists of a waistbelt or waistband.

It is general practice for waistbelts, such as are used for supporting trousers, or for waistbands of so-called "self-supporting" waist-hung garments, such as trousers or skirts, to be based upon a single straight-sided strip of pliant fabric or other material, such as leather, and for such strip to be applied around the body as a closed loop in a generally horizontal plane which is located above the level of the hips and where the body has its smallest width dimension. Although it is conventional practice for waistbelts and waistbands to be located at this level all around, it is, in practice, not possible to be free from discomfort due to uneven distribution of pressure across their width and, in addition, the belt or band at the front crosses and so restricts the muscle structure of the diaphragm.

It is accordingly an object of this invention to provide an article of wearing apparel of the type in question which is shaped so as to fit uniformly all around, giving better support for the garment carried by or including the belt or band and better support for the underlying muscle structure, particularly in the abdominal region.

According to the invention, an article of apparel includes or consists of a belt or band for encircling the body of a wearer in the region of the waist, which belt or band comprises an elongated portion of a pliant material shaped so that its axis of tension (as hereinafter defined) describes a geodesic circuit (as hereinafter described) about the wearer's waist region.

In the case of a single belt or band according to the invention, the basic belt or band, where more than one are used in combination, as explained in detail below, the preferred circuit followed is the shortest of those which traverses the supporting surface of the wearer's hip regions, referred to below as "the shortest geodesic circuit of support." As the belt or band following this line is itself supported by the hips, it in turn affords support for both the wearer's back and abdomen.

A "geodesic circuit" around a complex three-dimensional surface e.g. that constituted by a person's waist region, is a line forming a closed loop upon that surface located so that any small element of the line between two points on that surface is the shortest distance on that surface between the two points.

The "axis of tension" is the line, as explained in detail below, about which the forces in the belt or band in use are equal so that the two edges of the belt or band at any point along the axis of tension are at the same tension.

A conventional straight-sided belt is incapable of fitting snugly about a body of complex curvature such as a human body. In general, at any point one or the other edge will be in greater tension and will tend to cut into or ride over the body because the tension cannot act in a plane perpendicular to the surface of the body, and therefore a lateral component of force exists. This problem is avoided by shaping the belt in accordance with the teaching of the invention so that it has an axis of tension following a geodesic circuit of the body, since a geodesic line is such that its plane of curvature is always perpendicular to the surface of the body, and accordingly the tension in the belt will act perpendicular to the surface and the belt will fit snugly. These conditions cannot be satisfied by a straight-sided belt, only by a belt with a built-in transverse curvature.

In contrast to a line simply encircling the body at the waist, namely around the body at the narrowest width above the hips and below the ribs, which can be developed into a substantially straight line, which is the center line of any conventional belt, a geodesic circuit about which a band or belt according to the invention is described is, in developed form (for instance, when cutting the band or belt from a sheet of pliant material in flat condition), of complex curved form. This curved form is, in typical cases, different for bands or belts for male and female wearers, owing largely to the effect upon a geodesic circuit of support of the relatively greater hip spring or increase in hip size over the waist size of women in comparison with men. In order to retain equilibrium about its underlying geodesic circuit when under tension, the outline curvature of the belt or band must be such that, when looped, it exceeds the geodesic curvature to the degree at which the latter equals the difference between the two edge curvatures. Considered in a simple embodiment comprising a waistbelt of constant width, e.g. 1½", described about the wearer's shortest circuit of support, the belt present, considered as seen in a flat condition includes and is generally symmetrical about an upwardly-curved, viz. arched center-back portion, which, in use, lies across the small of the back. In use, this portion thus has a concave lower edge and a convex upper edge. In the next outward portions, the curve reverses so as to ascend when worn, the slope of the hip regions and the next potrions, which fit about the wearer's hips, where the girth dimension has its greatest increase in a downward direction, are straight or slightly upwardly concave when seen flat, according to hip spring, and when worn follow the cone shape of the hips so as to pass obliquely down their forward slope terminating in a short upward curvature (as seen flat), with the portions which meet or overlap at the center-front region being slightly arched (when seen flat) and traversing the abdomen well below the location of the navel, thus passing under the diaphragm structure. Typical developed belt shapes for male and female wearers are described below in more detail and it is to be understood that a waistbelt or waistband of this invention can be produced for and worn with advantage by persons of all ages and of any figure type.

The invention also provides an articulated belt or band which, in general, can be disposed in a flat, straight-sided condition and can also be put into a curved condition by fitting to an intended wearer for ascertaining the precise geodesic form of belt, suited to that person's body. When so fitted, this special form of belt or band can be held or locked in the fitted shape while being laid out in a flat but curve-sided condition, thereby serving as a pattern or template for a waistbelt or band or portion thereof and cut or otherwise made from flexible fabric or other suitable material.

In order that the invention may be more readily understood, certain preferred embodiments are described, by way of example only in conjunction with the accompanying drawings, in which:

FIGS. 1 and 1A show embodiments of geodesic waistbelts or waistbands of the invention for men's and women's garments;

FIG. 2 shows a perspective view of the waist region of a garment with a waistband and an associated upper waistband; the upper waistband is shown separated for clarity, but is in fact joined to the waistband of the garment;

FIG. 3 shows a perspective view of a composite waistbelt;

FIGS. 4A and 4B show a perspective view (FIG. 4A) of another form of composite waistbelt, with a detail view (FIG. 4b) of one form of fastening;

FIGS. 5, 5A and 5B show diagrammatically the relationship between parallel complex curved lines and their geodesic line;

FIGS. 6A to 6F show respectively detail views of the separate parts of an articulated belting used for fitting purposes and made in accordance with the invention;

FIG. 7 shows a fragmentary face view of the articulated belting formed from the parts shown in FIGS. 6A to 6F;

FIGS. 8A and 8B show by way of comparison, a conventional straight waistbelt (FIG. 8A) and a waistbelt according to the present invention (FIG. 8B), as seen in position upon a youthful male figure from one side;

FIG. 8C shows FIGS. 8A and 8B superposed, references being omitted for clarity;

FIGS. 9A, 9B$^1$ and 9B$^2$ show, respectively, a first form in perspective view (FIG. 9A) and a second form in two diagrammatic plan views (FIGS. 9B$^1$ and 9B$^2$) of a waistband according to the invention as applied to trousers, each form of the waistband having provision for adjustment in girth;

FIGS. 10A and 10B show one form of slide in elevation (FIG. 10A) and a cross-section (FIG. 10B) for use with an adjustable waistband construction, for instance of the kind shown in FIGS. 9B$^1$ and 9B$^2$, for withdrawing the surplus of a garment front panel into a front pleat;

FIG. 11 shows one of a pair of end plates for attachment of a half-belt to articulated belting of the kind shown in FIGS. 6 and 7;

FIGS. 12A and 12B illustrate elasticated fabrics for use with the invention;

FIGS. 13 and 14 show garments embodying the invention;

FIG. 15 shows an exploded view of a press-stud fastener;

FIG. 15A shows in perspective the female portion of the fastener;

FIG. 16 is a modification of the structure of FIG. 7;

FIG. 17 is a detail, in plan of the structure of FIG. 16;

FIG. 17A is a section taken along line 17A—17A of FIG. 16; and

Figure 18:
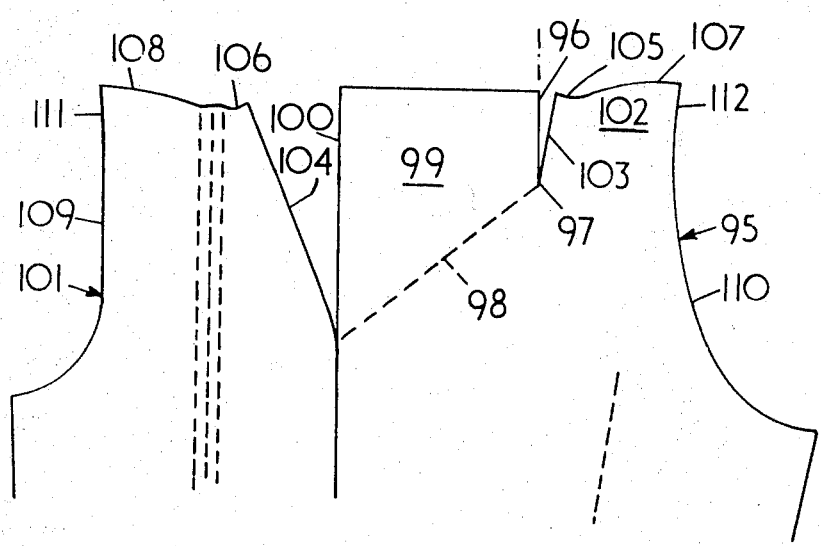

FIG. 18 shows how a nether garment is cut to conform to a geodesic waistband.

As previously mentioned, the invention is based upon the concept of a waistband or waistbelt derived from a geodesic circuit around a person's waist region. In other terms, there is provided a waistbelt having reciprocal curvature by which it is directed parallel to the surface at every point. Typical waistbelt shapes are shown in FIGS. 1 and 1A of the drawings. The shortest geodesic circuit of support is distinctive in that it passes high on the hips but an inch or two below the navel.

As the curvature of any given part of the geodesic circuit limits the width of the belt in that sector, a wider version may be made extending above the waist or downwards or both, by adding a secondary belt or belts according to the geodesic line of each corresponding zone. The juxtaposed shapes of a typical waistband and its associated upper zone band are shown in FIG. 2. The two (or more) belt or band shapes are joined along their concurrent edges, while looped, and then constitute a composite geodesic waistbelt (FIG. 3).

A typical complex belt shape derived as mentioned above may be molded in one piece, such as for instance as a wide waistbelt of pliant plastics material (FIG. 4).

In a particular embodiment of the invention, a geodesic waistbelt or waistband, thus dispensing with a belt, has a separate front section (see FIG. 4) enabling the buckle or other fastening to be centered, irrespective of the girth adjustment. This front section consists of a half-belt or half-band bearing a buckle which passes through loops at the ends of the main belt/or band, situated at positions corresponding to the front creases of trousers, and is doubled back to fasten. This gives the advantage of a finer girth adjustment, so that an alteration of, say 2" at the buckle makes an effective girth adjustment of 1" only. Since the abdominal region is mainly where alteration of a person's waist measurement may occur, the front section not only allows the belt or band of FIG. 4 to be accurately fitted, but also to be adjusted so as still to fit the person, despite the normal daily variations in girth which occur in that region.

Instead of including a half-belt as described above, a geodesic waistband may include a belt portion which is unattached to the front portion of the garment and is securable to the other end of the waistband by means of a clasp or buckle. The belt portion and the buckle may be attached to the garment at points equivalent to the places in mens' trousers where the front leg creases terminate at the waistband, which often in the form of small pleats. One embodiment showing this feature is illustrated in FIG. 1 which is described below in greater detail. For ease of description, the places mentioned are regarded as lying where the axes defined by trouser creases meet the waist region and the axes are referred to as "leg axes" herein.

The front portion of a garment supported by a geodesic waistband or waistbelt may be made self-adjusting sufficiently to accommodate the normal requirements of girth adjustment of the waistbelt or waistband per se which are effected by means of the half-belt or belt portion. To enable this to occur, the front portion has a separate section of waistband attached thereto and turned at the ends into two garment front pleats, forming the tops of the front leg creases where the garment comprises mens' trousers of convention type or formed at such places in other kinds of garment, i.e. at the "leg axes." An example of this is described below in relation to FIGS. 9A, 9B$^1$ and 9B$^2$.

This attached front waistband section may be stiffened to a point located within an inch or so of its pleats, and the remainder lined with thin rubberized or other sheeting such as will crease but not retain a crease. Tightening of the half-belt or belt portion has the effect of causing the resultant surplus width of the front panel to be taken up by enlargement of the pleats. A variation of, for example, half an inch per pleat gives a variation of two inches in the effective girth of the garment.

Alternatively to the use of stiffening, the front panel surplus may be withdrawn to either side by means of mildly elasticized webbing, either sewn behind the front panel waistband section an inch or so from the rear fold of each pleat (as shown in broken lines in FIG. 9A) or linked by means of a two-pronged slide (FIGS. 10A or 10B). An outer prong of the slide engages downwards in the rear fold of a pleat, being retained therein by an inner prong which points upwards and engages in the fold of a corresponding pleat in a band lining the attached front waistband section, with the lower edge of the lining band being unattached to the garment in the vicinity of the pleat so as to receive that prong. The webbing extends back, roughly horizontally, to a side seam of the garment and may be covered by a downward extension of the waistband lining, which will act also as a guide channel to maintain alignment.

Use of a geodesic waistbelt, with or without a half-belt, on a garment having a self-adjusting front panel as above requires attachment of the belt to the forward edges of the garment front pleats at the above-mentioned leg axes. This may be simply effected by two flattened metal hooks or clips fixed on the inside of the belt with their openings towards its fastening and placed so as to engage in a loop or eye in the forward edge of each pleat. Preferably the hooks are so shaped as to clip on to the loops and not become detached inadvertently.

The correct curvature for a geodesic waistbelt or waistband for any individual person can be ascertained with the aid of articulated belting (see FIGS. 6 and 7) which may be of even or varied width as required and can be locked in alignment to serve as template for a pattern.

The curvature for a secondary belt or band may be ascertained similarly with secondary belting, used in conjunction with the primary belting, or a belt or band made therefrom, while fitted.

The drawings will now be described in more detail:

FIGS. 1 and 1A show, seen in flat condition, one form of waistbelt or waistband for mens' or womens' garments respectively, and FIG. 1A is reversed to reveal fasteners on its inner surface. In both cases, a main portion 10, common to other forms of this invention, is symmetrical about an arched center back portion 44, 44A, which merges to either side in a short portion 12 of a reversed curve. These short portions lead on one side to a long straight or slighly upward curved portion 14 rising obliquely and merging in a second short upward curve 16 terminating at a line 40 (FIG. 1) or 40A (FIG. 1A) where one leg axis intersects the belt or band. On the other side, the relevant short portion leads to a long straight or slightly upwardly curved portion 14', as before, rising obliquely and merging in a second short upward curve 16' terminating in a loop 41 (FIG. 1) or 41A (FIG. 1A) where the other leg axis is located. The waist circuit also includes a front portion 39, 39A extending from the line 40, 40A which can be received in the loop 41, 41A at the other end of the main portion. This front portion 39, 39A, which is slightly arched upwardly so as to present an inwardly bearing surface across the lower abdomen is longer than the distance between the two leg axes to allow for its mode of fastening, and when forming part of a waistband, is unattached to the garment front panel. When worn, portions 14, 14' are arched over the hips and the front and back portions are generally horizontal.

As previously mentioned, the waistbelts shown in FIGS. 1 and 1A are typical of the present waistbelts and waistbands, though due to the many variations possible in the shaping of the waist region, FIGS. 1 and 1A are merely representative of the shapes which such belts and bands can have; it may be mentioned, however, that a waistbelt or waistband which consists of straight edges when laid flat forms no part of this invention.

The waistbelt or waistband is secured in each case by means of a flattened hook, shown in FIG. 1A at 42A, located on the inner surface of the front portion 39A at its free end. The free end is passed inwards through the loop 41A, doubled back and fastened to another part of the same portion by engaging the hook in any one of several small loops or eyes 43A on the longitudinal axis of its inner surface, and which loops are spaced to provide for alternative girth adjustments. In FIG. 1, the free end of the front portion 39 is folded back on to the inner side as in wear, its position and that of the hook 42, and eyes 43, being indicated in broken lines.

In FIG. 2, a trousers waistband is shown at $d$ and, at $c$, an associated upper waistband, with its lower edge being attached, e.g. sewn, to the uper edge of $d$.

FIG. 3 shows a composite wide waistbelt formed as a primary belt $d'$ and a secondary upper belt $e$, shaped to conform to an upper part of the waist region. The two parts $d'$ and $e$ are shown cross-thonged together while looped.

FIG. 4A illustrates a typical one-piece molded wide waistbelt, derived in pattern from a prototype belt, including upper and lower edge portions $f$ and $f'$ conforming to the different geodesic circuits of upper and lower waistband zones. This belt has a separate front section $g$ shown unbuckled at $g'$ in FIG. 4B.

FIG. 5 illustrates the relationship between reciprocal outline curves, such as the parallel curved lines shown at $h, h'$ and $i, i'$ with the corresponding geodesic line $j, j'$. The degree of curvature about a given geodesic curve increases with increasing width of the belt or band.

Figure 5A:
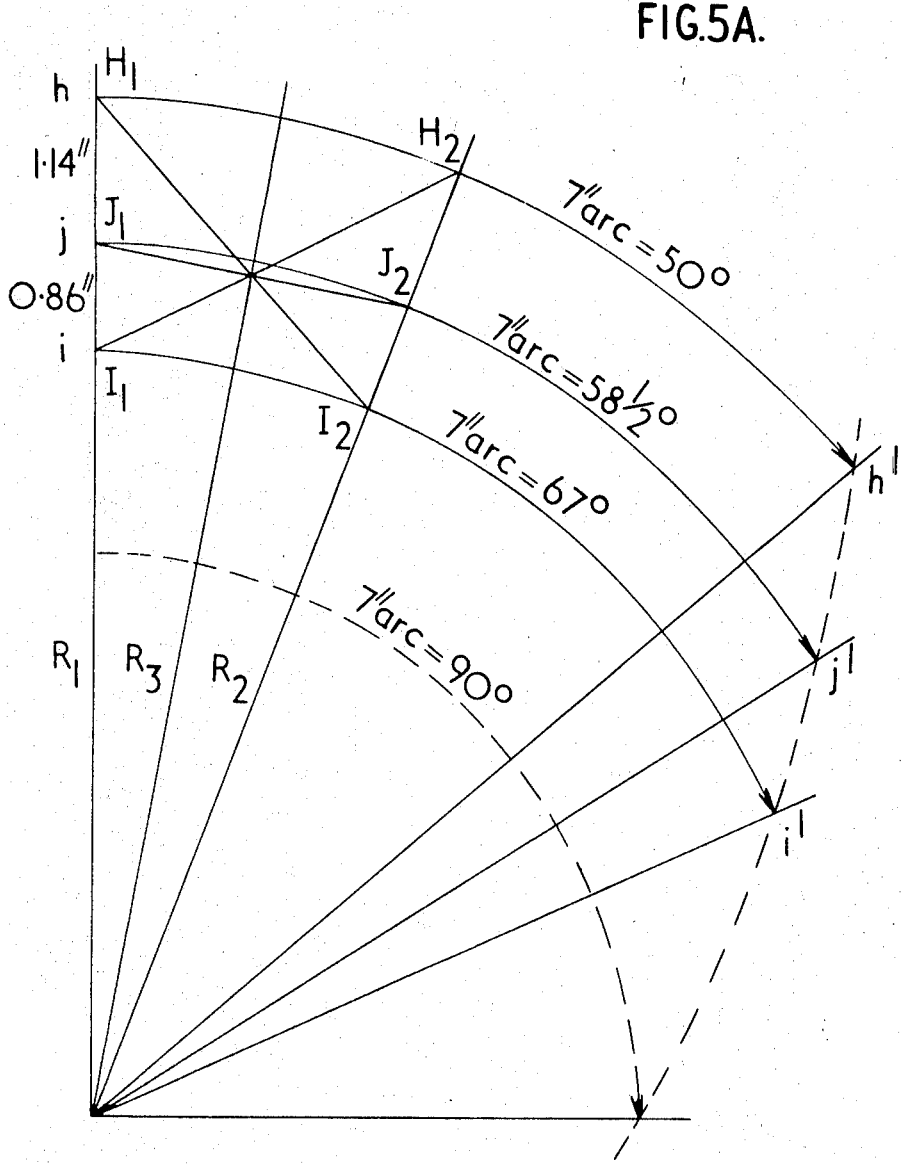

Various features of these curves will be elucidated with reference to FIGS. 5A and 5B. FIG. 5A relates to the determination of the axis of tension $j-j'$ in a band of constant transverse curvature and width bounded by curves $h-h'$ and $i-i'$. It is believed to be clear that a complex curve may be regarded as composed of portions of locally constant curvature. Over a given circumferential distance, the angular arc of the axis of tension is the mean of the arcs of the bounding curves. Its radius is not the mean of the bounding curves, i.e. it is not the center line of the band. For example, FIG. 5A illustrates the case of bounding curves of 6" and 8" radius, on which a 7" length extends over arcs of approximately 67° and 50° respectively. The mean arc is 58½° and the corresponding radius 6.86", whereas the mean radius is 7". The axis of tension curve can be obtained geometrically by drawing three radii equally spaced as at $R_1$, $R_2$, $R_3$ to intersect the bounding curves at $H_1$, $H_2$, $I_1$, $I_2$, drawing diagonals $H_1$, $I_2$ and $H_2$, $I_1$, and erecting perpendicularly to $R_3$ at their intersection which of course is on $R_3$. These perpendiculars intersect radii $R_1$, $R_2$ at $J_1$, $J_2$ which are points on the axis of tension.

Conversely, this means that a geodesic band of a width of 2" based on a geodesic line of radius 6.86" has a width extending from 0.86" within the geodesic line to 1.14" outside that line.

To construct a band on a geodesic line $j-j'$ of given curvature the, following procedure can be used (FIG. 5B), and the case of constant curvature is considered. Three equally spaced radii $R_1$, $R_2$, $R_3$ are drawn and the intersections $J_1$ and $J_2$ of outer radii $R_1$, $R_2$ on curve $j-j'$ are joined by a line which meets radius $R_3$ at right angles at $J_3$. Any diagonal line through $J_3$ will meet $R_1$ and $R_2$ at points on the inner and outer bounding curves, with the band width between these being determined by the slope of the diagonal line and thus selectable to a desired value.

The principles of the geometrical constructions just described can be embodied in an articulated band or belting. Such a band or belting can be employed as a template or the like for recording complex curves, or as means for supporting bodies of complex surface curvature, and in many other ways.

FIGS. 6A to 6F and 7 show, respectively, the component parts and an assembled portion of articulated belting of even width, showing half of a center-back hinge at $k$. A leather or other e.g. plastics flexible thong, giving continuity of outline, is shown at 1 (FIG. 7).

FIGS. 6A, 6B and 6C show at $m$, a transverse member of one form of articulated belting in front elevation, side elevation and plan respectively, with wing-screws $n$ and eased rivets $o$ as pivots. The ends $p$ form short tubes which hold the thong $l$ so that it has freedom to move relative to the transverse members.

Another form of transverse member for secondary belting (e.g. the upper waistband $c$ shown in FIG. 2) is shown at $q$, which is provided at $r$ with a groove at its lower edge. This groove $r$ enables the secondary articulated belting to engage in registry an edge of a primary, or preceding secondary template or a belt made therefrom, while fitting.

The articulated belting is constructed of the rigid transverse members $m$ or $q$ cross-linked by diagonal members $s$ pivoting thereon at $o$ and $n$ and of sufficient resilience for the whole to be looped around the waist. It is hinged transversely at half length by means of two hinge parts $k$. Each transverse member $m$ is coupled to the next in turn by two diagonal members $s$, as shown in FIG. 7. The pivots at one end only of the members $m$ or $q$ or both pivots of alternate transverse members $m$ or $q$, consist of wing-screws $n$ for locking the articulation, with the remainder of the pivots taking the form of eased rivets $o$, which allow the articulations to move relative to one another when the wing-screws are loose. The transverse members are connected also by the leather thong $l$ or other flexible stay threaded through the rolled tubular ends $p, p'$. The thong $l$, which provides continuity of outline for subsequent tracing or marking out, fits the tubes $p, p'$ so as to assist their alignment without preventing their sliding freely.

Girth adjustment of the belting may be provided by means of a half-belt bearing a buckle, as shown on a waist-belt in FIG. 4. FIG. 11 shows a plate for securing by wing-screws to each of the terminal transverse members to take the half-belt.

FIGS. 8A, 8B and 8C show the waist of a young male person in three different views. FIG. 8A at the left shows the waist in its conformation to a traditional straight waistbelt. The belt exerts pressure on the abdomen above the pivotal center of muscular retention at the navel (indicated at X) and this results in a downward thrust about the pivot indicated by an arrow 20. In augmenting the effect of intestinal weight, indicated with an arrow 21 and also by depressing the pivot itself, the belt pressure upsets the equilibrium between the muscles of the upper and lower abdomen leading to the condition shown in dotted lines the position of the navel is shown at X'.

These muscles, the natural shortening tone of which is self-adjusting to variations of intestinal pressure, are further weakened by the action of the wearer in frequently relaxing in order to allow the intestinal weight to expand the same. This occurs because of the necessity for maintaining the garment in position at an arbitary level.

The long-term effect of wearing such a belt is indicated in broken lines. The effects of wearing a garment having a straight waistband supported by braces, or any dress or underclothes designed to concentrate constriction above the navel is the same if more gradual.

The same waist is shown in FIG. 8B at the right in its conformation to a geodesic waistbelt according to this invention, with no effort beyond muscle tone. The navel, indicated at $X^2$, is sustained by the muscles in its central pivotal position and helped to stay in such position by the pressure of the belt therebelow. As this pressure acts about the pivot, this results in an upward thrust 23 tending to neutralize the intestinal weight and thereby assist the abdominal muscles in their natural function, while at the same time supporting a nether garment at the logical place, i.e. the shortest geodesic circuit of support.

The outlines of FIGS. 8A and 8B are shown superimposed at FIG. 8C for precise comparison.

FIG. 9A shows a self-adjusting trousers waist with a geodesically fitted main waistband 25 and a separate front waistband section 26, which is turned at its ends into front crease-pleats, open at their top ends 27, 27A and located at the "leg axes" aforementioned. Loops or like members, indicated at 28 and 28A, are provided on the forward edges of each of the pleats for connection to a half-belt (not shown), which can be of the type illustrated in FIG. 4, for instance. The rear creases of the two pleats are retained, by mildly elasticized webbing portions 29, 29A, indicated by broken lines, which pull them away from the center front part of the garment, while their forward edges are held towards the center by the half-belt already mentioned. The webbing portions 29, 29A have their rear ends anchored at 30, 30A in the trouser side seams. An alternative form of adjustable waistband is shown in FIGS. 9B$^1$ and 9B$^2$, with the garment front panel being shown expanded in FIG. 9B$^1$ and contracted in FIG. 9B$^2$, and the half-belt is shown at 34.

Two views are shown of one form of fastening, in elevational view, FIG. 10A, and in section, FIG. 10B, taken on the line 38 in FIG. 10A. This shows a two-pronged slide member 35 for linking elasticized webbing to a front pleat of a garment. The position of the slide 35 relative to a separate front waistband section (such as that shown at 34 in FIGS. 9B$^1$ and 9B$^2$) is indicated in broken lines in FIG. 10B. Elastic webbing 36 is attached to the slide 35 by having one end passed through a slot in the slide 35 and being secured to the webbing 36 itself with a flat hook 37 which can be engaged in any weft thread of the webbing 36 along a narrow warpless center region thereof. The other end of the webbing is secured in the garment side seam.

In order to obtain a pattern for a belt with the aid of articuculated belting, a length of the belting is tied by its thongs, or secured at the buckle of half-belt affixed by a bracket to each end, about the waist at comfortable tension, with the wing-screws being eased, and is guided progressively into a path of less inward pressure by curving each portion of it convexly of less concavity at its tighter edge, thus taking up slack by inducing reciprocal concavity or less convexity in its looser edge. In this way, the line joining the points of intersection of the center lines of the crossed diagonal members $s$ approximates to the position of the shortest geodesic circuit of support about the person's waist.

In the fitting operation, difference of pressure between the two edges is guaged with the finger and thumb at the ends of each transverse member in turn, with the overall slack resulting from this economy of line being taken in by refastening the belting.

As these local directional changes bring the tension into alignments with the muscular effort sustaining the present waistline, the relieved muscles effect their own economies and reshape the waist region into more curvaceous geodesic lines. The belting is further adjusted accordingly.

Equilibrium of this order having been attained, the wing-screws are tightened, thus locking the curvature, the effective girth is noted and the articulated belting removed. It may then be folded double at its hinge $l$, in order to compare the two sides, and any discrepancy is adjusted by refitting and easing the relevant wing-screws.

The template thus shaped is laid full length in flat condition and traced on to pattern material or scored direct on material for a belt or waistband.

To obtain the pattern for an upper or lower zone, a length of secondary articulated belting is fitted with its grooves against an edge of the primary template or of a belt or band which has been made therefrom, while worn.

This edge acts as a base line.

With its grooved edge thus held in registry, curvature of the secondary belting is manipulated so as to equate inward pressure at its free edge with that at the opposite edge of thep rimary or preceding secondary template, belt or band.

It is to be understood that the articulated belting is of general utility as a means of recording or reproducing complex curves and in particular geodesic paths. Furthermore, its flexibility in its own plane renders it suitable for use as a sinuous conveyor and like uses. While in the embodiment described, the intersections of the diagonals S provide only an approximate record of the geodesic line. An accurate record can be obtained if suitably curved slits are made in the diagonals (see FIG. 16), with intersections of these slits lying exactly on the geodesic line. The required slit shape can be determined by a geometric construction: one diagonal is regarded as fixed and the two associated transverse members are pivoted thereon while remaining connected by the other diagonal; for a succession of positions, the intersection of the geodesic curve and the diagonals is plotted using the principles described with reference to FIG. 5A, with these intersections together forming a curve of the required slit shape.

An articulated belt itself may be used in wear as a geodetically self aligning belt or belt portion, e.g. as a body harness or part thereof permitting universal curvature. Screws for locking the articulation will normally be replaced for such uses with cased rivets or their equivalent.

The free ends of the thongs or cords $l$ forming the belt edges, which vary in effective length according to the outline curvature, will require to be joined together so as to be able to compensate for any change in the relative lengths of the two sides by passing around either or both ends of the belt from one side to the other, as indicated in FIG. 7. This transference will be facilitated with a terminal transverse member which presents a semicircular end piece, either grooved at the edge or containing there a tube connecting those at the end of the transverse member. In lieu thereof the terminal member may contain a pulley wheel for this purpose. A buckle or other fitment is attached to the transverse member or pivoted at the wheel hub.

The spacing apart of the transverse members $m$ is arbitrary and so will depend on the functions to be served by the belt. A secondary function of the spacing is here described:

The greater the separation of the transverse members relative to their lengths, the lower the critical tension at which the symmetry of the articulation will deform spontaneously to a wave-like formation. This is brought about by tension through the articulation (not through the edge thongs) causing the transverse members to rotate into inclined pairs, thus occasioning loss of width in the belt and a corresponding increase in its length.

Such deformation will be checked by the edge thong or cord $l$ of the belt. However, in the event of the two sides having been joined as one around the ends and will be governed therefor to some extent by the thong's tensility and/or breaking point. These three variables are calculable and so may serve as a safety factor.

In order to prevent clothing or other impediments from catching in the articulation, the belt or belt portion may be sheathed in two-way stretch fabric and if his covering is strained thereover will remain crease free up to the degree of belt curvature at which that tension is fully released about a concave edge.

The invention may be summarized as providing a waistbelt or band having reciprocal outline curvature by which it is directed parallel to the surface at every point of a waist's shortest geodesic circuit of support, and can take the form of a composite waistbelt, following more than one geodesic line, which may be made in one piece of a pliant plastics material. The invention also provides, articulated belting having even or varied width which is preferably hinged transversely at half-length and can be locked in any alignment to serve as a template for a curvature pattern.

As the exact fit and consequent comfort of a waistbelt or waistband according to this invention draws increased attention to the importance of easy girth adjustment, the invention includes also a means of applying finer adjustment, whether by buckle or hook and eye fastening, together with associated means whereby surplus material in the waist region of a garment front panel may be automatically withheld.

Where preferred to manual girth adjustment however, or in addition, or where necessary as with underwear for example, a measure of self adjustment in a waistbelt or waistband is envisaged in which one-way stretch material may be incorporated in the long straight or almost straight sections of the circuit at the sides where its geodesic curvature is derived from the conical surface of the hip region.

The remainder of the circuit comprising the back and front of the waistband should, in such cases, be in plain nonstretch material cut to the required outline curvature, or simply continued by the garment material, shaped at its upper edge as the upper edge of a geodesic band in those sectors.

For simplicity of manufacture however, e.g. of men's pants, trunks or briefs, the elasticity may be continued right around the back of the garment at about traditional level without seriously impairing the main advantages of the geodesic waistband which relate to the front and sides of the body.

Because a geodesic waistband when under tension tends to retain or return to its alignment, such elasticity will require only sufficient tension to counteract the small weight of these garments. The other function is to enable a garment to be pulled on over the thighs and lower hips without need for other means of opening.

The abdominal portion of a geodesic waist belt or band, or an extended front portion as shown in FIG. 1, or half-belt as shown in FIG. 4, being of a uniform transverse curve, may be made of a one-way stretch fabric which is straight woven or knitted but yet will curve to the required arc when stretched in use. A transverse curve potential is woven into the fabric as follows:

Elastic warp strands 50 of equal gauge are distributed at graduated intervals across the width of the fabric 51, with each interval containing the nearest appropriate number of non-elastic warp threads 53 (FIG. 12a); and/or elastic warp strands 50 of slightly differing gauges are spaced uniformly across the width of the fabric 51, with each interval containing an equal number of non-elastic warp threads 53. It is not necessary for every elastic warp to be of a separate gauge; three or four gauges will suffice, or even two if suitably interspersed.

The edge of the material towards which the elastic warp strands are wider spaced, or their weight of gauge decreases, as the case may be, the lower edge as shown, will stretch more readily than the other edge and so will become convex under tension, with the axis of tension following the geodesic of the outline curvature. Fastenings such as the prong of a buckle or a flattened hook and their associated loops or eyelet holes will be aligned therefore on that axis.

Because too much or too little tension in a belt or band fitted across the abdomen is injurious to health, the former through undue constriction of the body and the latter through causing muscles to sag unduly in order to allow pressure of visceral weight to bear against a garment merely for the purpose of supporting it, the automatic adjustability of stretch material should be supplemented with a means of adjusting the stretch available. Provision for this may be made in underwear as follows (FIG. 13):

In a pair of men's pants 54 having a front panel 55 to form an overlapping opening, a short length 56 of curved one-way stretch fabric is inserted as the abdominal portion of an otherwise non-stretch geodesic waistband 57. A second similar length 58 of the stretch fabric, or an extension of the first from its left-hand end folded forward for the purpose is attached across the top of the front panel, which is unattached to the garment at its upper and right-hand edges. The panel is fastened across by means of a flat hook 59 or hooks, located at the free end of its stretch fabric portion engaging in small loops 60 or eyelets spaced for tension adjustment along the outer face of the inner stretch portion. As an alternative, the outer stretch portion may extend beyond the free edge of the panel through a loop at the right-hand end of the inner stretch portion, and is doubled back thence to fasten by a flat hook at its end to one of several loops or eyelets spaced along its own outer surface.

Thus, a basic inner stretch element formed by a fixed portion of curved fabric which holds the garment to the body is supplemented with a supporting outer stretch element formed by an adjustable portion of curved fabric.

The same may be used to advantage in women's underwear as follows (FIG. 14):

A girdle 61 has similarly a short length 62 of curved one-way stretch fabric inserted as the abdominal portion of an otherwise non-stretch geodesic waistband 63. This stretch portion is overlaid with a considerably longer length 64 of curved stretch fabric of the same width and extending therebeyond to either side in a continuing downward curve. Beyond the limits of the inner stretch portion the course of the outer band diverges from that of the waistband because of their opposed curves in that zone, such that at about two inches from the abdomen they are clear of each other.

To either side, the outer band enters a guide channel 65 on the surface of the garment, curved in outline to receive the band; or the band may then pass through a slot in the garment and continue its course through a similar channel on the garment's inner surface.

The ends of this band terminate each at the side of the body in the hollow which may be felt immediately above the head of the femur and are there anchored by attachment to a pentagonal piece 66 of backing material which reinforces the garment and overlies the hollow. Thus tension thereon at that point is borne diffusely by the garment portion which covers the seat. Note the geodesic lines shown as chain lines 71.

The line followed by this long support band 64 is inches shorter when the wearer is in a sitting posture than when standing, so tension on the abdomen will be eased on taking a seat and braced again on rising. It will also assist the wearer in sustaining the waistband of the garment at the correct low level in front, especially if the two bands are then attached to one another at the body's center axis as shown at 70.

Provision for adjusting tension in the support band may be made at or near each end and if its course at the sides lies on the inner face of the garment it may there be brought through again for this purpose.

Similar additional support may be given to the waistline across the small of the back, with or without inserting therein a short inner length of curved one-way stretch fabric as in front. Another long length 67 of the stretch fabric curves correspondingly around the back overlying the arched portion of the waistband, entering likewise a guide channel 68 on the line where it clears the waistline and continuing downwards to determine at the same two pentagonal pieces 66 as the front support band. Resistance to its tension beyond these points is being distributed along the groin line and across the lowest part of the abdomen. The line followed by this band too shortens in the seated figure. The focal point where the tension lines 71 deriving from the two support bands intersect in each piece 66 coincides with the uppermost limit of the leg's outer surface and is thus the longest site for a clasp or other fastening at 69 to support a full length stocking. A stocking for this attachment requires a shaped edge so as to fall obliquely from that point into a loop about the leg's inner, upper border.

The stretch element associated with conventional double suspension is unnecessary because the single fastening is located at the focus of all leg movement.

The fastening may be concealed by a flap 72 of the garment material, unattached at least at its lower edge and covering the pentagonal piece 66. The flap may be extended forward and/or back as a narrow skirt piece or the like to cover the region where garment and stocking meet. Alternatively or additionally the garment may have short leg pieces to fit inside and possibly show through the stockings, e.g. with decorative edges. The flap may be ornamented.

The fastening may be a press-stud or like fastening with one portion attached to the backing piece 66 and the other to the flap 72, to grip the stocking therebetween. A possible fastening is shown in FIG. 15. The male portion 73 has a flange 74 perforated for attachment to cloth and a boss 75 with peripherally spaced recesses with the lateral projections 76 therebetween containing lots or grooves 77. The female portion 78 has likewise a flange 79, and a recess 80 through whose wall project arcuate portions 81 of one or more convoluted wire springs 84 housed between the outer wall of recess 80 and a rim 82. A top perspective view of portion 78 with one spring element 84 is shown at the bottom of FIG. 15A. In use, the portion 73 enters portion 78 with projections 76 between spring portions 81, and is then rotated so that projections 76 displace the spring portions and then the latter enter slots or grooves 77 to lock the fastener.

Alternatively, a tape attached at one end to backing piece 66 may be passed through a hole in the stocking or a loop or tag thereon, and looped back for its free end to be secured in any suitable way, e.g. a flat clip on the tape engaging a flat loop on the piece 66. A stud on the garment may fit the hole and carry tapes attachable at their free ends on the lines of the tension axes 71 (FIG. 14). The hole may be in the knitting of the stocking or in a seam, or may be cut through a previously fused or bonded or reinforced portion of the stocking.

A geodesic waistbelt or waistband may be made wholly or in any portion of its length of a homogeneous elastic material cut or molded to the required outline curvature. Its pattern will require that it be sufficiently shorter in length than that of a non-elastic geodesic belt fitting the same wearer, to allow for the correct location of curves when stretched.

Loss of width due to the stretching may be prevented by incorporating semi-rigid transverse members at short intervals. These may be introduced in a molding process, or they may be bedded between two identical thin layers of the elastic material welded together. Their presence will have the effect also of checking undue length of stretch without reducing it initially. Eyelet holes for fastening a buckle will be best located each against a transverse member to avoid straining or tearing of the material.

FIG. 16 shows a development of the structure of FIGS. 6 and 7. It incorporates curved slits 86 as previously described, with members s being curved to accommodate the slits without loss of rigidity. The geodesic line is traced by a flexible inextensible thong 87 guided in sleeves 88 (FIG. 17) attached to screws 89 fitted with washers 90 and screwed into bushes 91 fitted with handles 92. Each screw 89 traverses the slits 86 of a pair of intersecting members s, with one washer 90 being on each side of the pair. If handle 92 is screwed down, the members s and the associated members m are clamped in position and clamps at pivots o are not needed. Members m preferably have slots to accommodate the thong 87 without preventing movement of the latter in the longitudinal direction of the member m. Instead of the continuous edge thong 1 of FIG. 7, adjacent members m carry mating flexible rods 93 and tubes 94.

Variations in spacing between adjacent pivots o are accommodated by the sliding of rods 93 in tubes 94 instead of by relative sliding of the pivots and a continuous thong. The problem of securing and accommodating the ends of a continuous thong is therefore eliminated, and adjustment of the structure to a particular shape is facilitated. The effective length of the thong 87 is substantially unaffected by changes in shape of the structure and therefore a telescopic construction corresponding to the edge thongs is not needed.

The waist region of a nether garment requires to be cut in conformity to a geodesic waistband so that the planes of material shape thereinto and hang properly therefrom, e.g., two pieces of cloth prepared for making up as one side of a pair of trousers by joining down an outer side seam are viewed in flat condition (see FIG. 18, in which the hems are omitted for clarity).

In the upper edge of the rearward piece 95 a vertical cut 96 has been made down to a point 97 coinciding in wear with the hip prominence or fullness located in that quarter. This point being above the level at which the head of the femur projects against the side seam, and diagonal axis 98 exists between the two prominences such that inclining the portion of material 99 above that axis inward about the hip surface results in the portion tilting forward also at its forward edge 100 relative to that adjacent portion of the forward piece 101 which covers the fore part of the hip when similarly inwardly inclined; and tilting rearward at the cut 96, relative to the adjacent portion 102 forming the back half-panel.

These lateral slants are retained in portion 99, with surplus material being cut from the adjacent portions to receive them and leaving the diagonal edges shown at 103, 104 respectively. The latter approximates to the line of slanting pocket openings in common use.

The upper edge of the portion 99 which is cut straight and at right angles to the side seam, or slightly concave according to hip spring, then assumes the same line as does the hip portion of a geodesic waistbelt or waistband when in wear. Its line may coincide with either the upper edge of the waistband, which then is superimposed, or with its lower edge, with the band being joined by sewing at that edge while looped.

In the upper edge remaining in each piece beyond the point thus spanned by its hip portion and forming the front and rear half-panel respectively of the garment, are cut a short upward curve 105, 106 and half-arch 107, 108 corresponding to those in the rear and front portions of a geodesic band.

The front and back seams 109, 110 are flared slightly in their top few inches 111, 112 to fit the belt or band's reversed cone shape of support in those regions.

What I claim is:

1. A waist-encircling band of wearing apparel, comprising a band-like element for encircling the body of the wearer in the region of the waist, said band-like element including an elongated portion of a pliant material having an axis of tension defined by a line about which the compressive forces in the band-like element extending perpendicularly from the surface of the wearer are equal when worn whereby the opposite edges of said element at any point along the axis of tension are at the same tension thereby exerting uniform pressure against the wearer and the axis of tension describing a geodesic circuit constituted by a line providing a closed loop upon the surface defined by the wearer's waist region located so that any small element of the line between two points on that surface is the shortest distance on that surface between the two points, the elongated portion being shaped as to overlie the shortest circuit of support, said band-like element, when flat, including a generally symmetrical arched center-back portion arranged to lie across the small of the back when worn, said center-back portion merging at each end into a portion of reversed curvature, arranged to arise over the wearer's hip regions when worn, each portion of reversed curvature in turn merging into a further portion which, when flat, is substantially straight and, when worn, extends obliquely downwardly to accommodate the shape of the wearer's hip and to terminate in a shorter portion arranged to turn upwardly from the obliquely downwardly extending portion, the circuit being completed by a generally symmetrical arched center front portion extending from the one said shorter portion to the other, which arched portion, when worn, lies across the front region and reaches under the wearer's diaphragm structure.

2. The article according to claim 1 which comprises a garment waist band having a main portion attached to the remainder of the garment, a front section unattached to the garment extending at one side from a front leg axis and a loop at the other front leg axis.

3. The article as claimed in claim 2, in which the front section includes one end portion of the waist band and has a flattened hook on the inside arranged to be secured by passing such end portion through the loop on the other end portion on said other leg axis and then engaged in one of a number of eyes located at spaced positions along the inside of the first-mentioned end portion between such hook and the first-mentioned front leg axis.

4. The article according to claim 1 which comprises a lower garment waist band having a main portion attached to the remainder of the garment and a front section also attached to the garment and to such main portion, the ends of the front section being turned into front folds of pleats in the garment, said garment including elastic webbing along the sides thereof, the associated rear folds of said front section being connected by said elastic webbing portions to side parts of the garment, whereby tension is applied to such front section in use.

5. The article according to claim 4 in which a two-pronged slide member links said webbing portions to a rear fold of a front crease pleat of the garment, and a flat hook carried by one end for engaging in a web thread along a warpless center region of the webbing.

6. The article according to claim 5 in which said two-pronged slide member has an outer, downward prong arranged to slide in the rear fold of the pleat and an inner, upward prong for sliding in the fold of the corresponding pleat in a front waist band lining section partly unattached at its lower end with the webbing being secured to said slide member by being passed through a slot therein and adjustably attached to itself by the flat hook.

7. The article according to claim 1, comprising a waist band in which the straight side portions for traversing the wearer's hip regions comprise one-way stretch material.

8. The article according to claim 1, in which the band comprises at least a portion of one-way stretch material whose elasticity varies across its width whereby said portion embraces said geodesic curve when stretched.

9. The article according to claim 8, wherein said portion is a front portion over the wearer's abdomen and a further portion of said one-way stretch material over lies said front portion.

10. The article according to claim 9, wherein said further portion includes means for adjustably attaching said further portion to said band.

11. The article according to claim 8, wherein said article is a girdle and said portion is a front portion to overlie the wearer's abdomen and wherein a further portion of said stretch material overlies at least one of the front and rear portions of the band, and means being provided on said girdle for guiding said further portion and for anchoring same in the vicinity of the head of the wearer's femur.

12. The article according to claim 11 having, on said anchoring means, stocking suspending means.

13. An article of manufacture comprising an articulated belt selectively adjustably disposable in a flat straight-sided condition and in a laterally curved condition, said belt comprising a plurality of selectively adjustable transverse members and for each two adjacent transverse members, two mutually crossing diagonal members, one end of each diagonal member being pivotally secured to one end of one transvberse member and the other end of the diagonal member being pivotally secured to the other end of the other transverse member, and means for locking said belt in said adjusted position.

14. The article according to claim 13 comprising a flexible thong member slidably coupling the ends of the transverse members on each side of the band.

15. The article according to claim 14 wherein said flexible thong member is continuous from one side to the other side of the band by being looped back on itself at least one end of the band.

16. The article according to claim 13 comprising a sheaf of a two-way stretch fabric enclosing said band.

17. The article as claimed in claim 1 in which said band-like element includes a separate front band section having fastening means for said front section, said band-like element including brackets on the opposed forward ends of the main portion for receiving said separate front band section for enabling the girth of the band-like element to be adjusted and said fastening means centered in a single operation.

18. A method of producing an elongated article of wearing apparel and more particularly a band-like element for encircling a wearer's body in the waist region, comprising shaping an elongated portion of pliant material, while flat, to provide such variations of direction along its length to coact with a subsequent curvature of the band-like element during wear into a loop thereby developing variations with respect to the horizontal plane corresponding to those presented by the wearer's body in a circuit thereof at the waist level, and laying out the band-like element lengthwise into two zones of equal and opposite tension for providing an axis of tension traversing the band-like element with such axis coinciding with a geodesic circuit of the wearer's body constituted by a line upon the surface of the wearer's body, the plane of curvature of said geodesic circuit being at all points perpendicular to the surface of the wearer's body whereby the compressive forces in the band-like element resulting from such tension and extending perpendicular from the surface of the wearer are equal when said band-like element is worn, with opposite edges of the element at any point along the axis of tension being at the same tension and exerting uniform pressure against the wearer.

References Cited

UNITED STATES PATENTS

| 464,916 | 12/1891 | Taylor | 2—237X |
| 1,662,981 | 3/1928 | Pazowski | 2—237X |
| 2,392,761 | 1/1946 | Pease | 2—311 |
| 2,574,678 | 11/1951 | Wilbur | 2—311X |
| 2,757,381 | 8/1956 | Cottier et al. | 2—237 |
| 3,204,253 | 9/1965 | Sato | 2—237 |

FOREIGN PATENTS

| 4,786 | 1893 | Great Britain | 2—311 |
| 397,437 | 8/1933 | Great Britain | 128—579 |

H. HAMPTON HUNTER, Primary Examiner

U.S. Cl. X.R.

2—237, 243, 224, 311, 338; 128—100, 579